(12) United States Patent
Peng et al.

(10) Patent No.: US 12,531,697 B2
(45) Date of Patent: Jan. 20, 2026

(54) DATA TRANSMISSION METHOD AND DEVICE

(71) Applicant: VIVO MOBILE COMMUNICATION CO., LTD., Dongguan (CN)

(72) Inventors: Shuyan Peng, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 364 days.

(21) Appl. No.: 17/864,374

(22) Filed: Jul. 13, 2022

(65) Prior Publication Data

US 2022/0353044 A1    Nov. 3, 2022

Related U.S. Application Data

(63) Continuation of application No. PCT/CN2021/071800, filed on Jan. 14, 2021.

(30) Foreign Application Priority Data

Jan. 20, 2020    (CN) .......................... 202010066535.4

(51) Int. Cl.
H04L 5/00    (2006.01)

(52) U.S. Cl.
CPC ................. *H04L 5/0053* (2013.01)

(58) Field of Classification Search
CPC ......... H04L 1/18; H04L 5/0044; H04L 5/005; H04L 5/0053; H04W 72/04; H04W 72/12; H04W 72/11; H04W 72/115; H04W 72/40; H04W 72/50; H04W 72/51; H04W 72/512; H04W 72/0457; H04W 72/044; H04W 72/535
See application file for complete search history.

(56) References Cited

U.S. PATENT DOCUMENTS

| 11,690,045 B2* | 6/2023 | Roth ................. H04W 72/1263 370/329 |
| 11,825,560 B2* | 11/2023 | Panteleev ............. H04W 72/20 |
| 2009/0103511 A1* | 4/2009 | Marinier ................ H04L 47/36 370/345 |
| 2013/0034064 A1* | 2/2013 | Nam ..................... H04W 72/23 370/329 |
| 2014/0094183 A1* | 4/2014 | Gao ....................... H04W 72/51 455/450 |

(Continued)

FOREIGN PATENT DOCUMENTS

| CN | 109728888 A | 5/2019 |
| CN | 111263454 A | 6/2020 |

(Continued)

OTHER PUBLICATIONS

International Search Report issued in corresponding International Application No. PCT/CN2021/071800, mailed Mar. 29, 2021, 6 pages.

(Continued)

*Primary Examiner* — Stephen J Clawson
(74) *Attorney, Agent, or Firm* — IPX PLLC

(57) ABSTRACT

A data transmission method and a device are provided. An exemplary data transmission method includes: determining a transport block size (TBS); and sending or receiving information according to the determined TBS.

20 Claims, 4 Drawing Sheets

100

Determining a transport block size (TBS) — S102

Sending or receiving information according to the determined TBS — S104

(56) References Cited

U.S. PATENT DOCUMENTS

| | | | |
|---|---|---|---|
| 2019/0045390 A1* | 2/2019 | Davydov | H04W 28/10 |
| 2019/0104525 A1 | 4/2019 | Santhanam et al. | |
| 2019/0200330 A1* | 6/2019 | Wikström | H04W 72/23 |
| 2019/0364585 A1* | 11/2019 | Lee | H04W 4/40 |
| 2020/0106566 A1* | 4/2020 | Yeo | H04L 1/1854 |
| 2020/0260472 A1* | 8/2020 | Ganesan | H04W 4/46 |
| 2021/0194652 A1* | 6/2021 | Khoryaev | H04L 5/06 |
| 2022/0159703 A1* | 5/2022 | Kim | H04B 7/0456 |
| 2022/0201734 A1* | 6/2022 | Kim | H04W 72/23 |

FOREIGN PATENT DOCUMENTS

| | | | |
|---|---|---|---|
| CN | 111800220 A | 10/2020 | |
| WO | 2018135905 A1 | 7/2018 | |
| WO | 2019099469 A1 | 5/2019 | |
| WO | 2019157739 A1 | 8/2019 | |

OTHER PUBLICATIONS

VIVO., "R1-2000315:Remaining issues on physical layer structure for NR sidelink.", 3GPP TSG RAN WG1 #100., Mar. 6, 2020.
Apple., "R1-1912810: On NR V2X Physical Layer Structure.", 3GPP TSG RAN WG1 #99., Nov. 22, 2019.
Apple., "R1-1910964:NR V2X Sidelink Physical Layer Procedures. ", 3GPP TSG RAN WG1 #98bis., Oct. 20, 2019.
First Office Action issued in related Chinese Application No. 202010066535.4 , mailed Jan. 6, 2022, 36 pages.

* cited by examiner

DATA TRANSMISSION METHOD AND DEVICE

CROSS-REFERENCE TO RELATED APPLICATIONS

The application is a continuation of International Application No. PCT/CN2021/071800, filed on Jan. 14, 2021, which claims priority to Chinese Patent Application No. 202010066535.4, filed on Jan. 20, 2020. The entire contents of each of the above-identified applications are expressly incorporated herein by reference.

TECHNICAL FIELD

Embodiments of the present disclosure relate to the field of communications, and in particular, to a data transmission method and a device.

BACKGROUND

The frame structure of a Long Term Evolution (LTE) system only allows the minimum frame structure scheduling period of 1 ms; however, in a New Radio (NR) system, one or several symbols are allowed to serve the minimum scheduling period. Compared with LTE, the shorter scheduling delay and the faster service start can be achieved in the NR system. Therefore, the data scheduling transport mode of the LTE system has been already difficult to be applied to the NR system. If the data scheduling transport mode of the LTE system is continuously used, the success rate of data transmission may be reduced.

SUMMARY

The embodiments of the present disclosure provide a data transmission method and a device.

According to a first aspect, a data transmission method is provided. The method is performed by a communication device and includes:
  determining a TBS; and
  sending or receiving information according to the determined TBS.

According to a second aspect, a communication device is provided. The communication device includes:
  a determination module, configured to determine a TBS; and
  a transmission module, configured to send or receive information according to the determined TBS.

According to a third aspect, a communication device is provided. The communication device includes: a processor, a memory, and a computer program stored in the memory and capable of running on the processor. When the computer program is executed by the processor, the steps of the data transmission method provided in the first aspect are implemented.

According to a fourth aspect, a computer readable storage medium is provided. The computer readable storage medium stores a computer program. When the computer program is executed by a processor, the steps of the data transmission method provided in the first aspect are implemented.

BRIEF DESCRIPTION OF DRAWINGS

The accompanying drawings illustrated herein are provided to further understand the present application and form a part of the present application. The exemplary embodiments of the present application and the descriptions thereof are used to explain the present application and do not constitute an improper limitation on the present application. In the accompanying drawings.

DETAILED DESCRIPTION

The following describes the technical solutions of this application with reference to the embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application. The term "and/or" in the embodiments of this specification indicates at least one of the former item and the latter item.

It should be understood that the technical solutions in the embodiments of the present disclosure may be applied to various communication systems, such as a Long Term Evolution (LTE) system, an LTE Frequency Division Duplex (FDD) system, LTE Time Division Duplex (TDD), a Universal Mobile Telecommunication System (UMTS) or a Worldwide Interoperability for Microwave Access (WiMAX) communication system, a 5G system, or a New Radio (NR) system, an LTE sidelink system, an NR sidelink system, or a subsequent evolved communication system.

In the embodiments of the present disclosure, a terminal device may include but is not limited to a Mobile Station (MS), a mobile terminal, a mobile telephone, User Equipment (UE), a handset, portable equipment, a vehicle, an infrastructure, a Road Side Unit (RSU) and the like. The terminal device may communicate with one or more core networks by using a Radio Access Network (RAN). For example, the terminal device may be a mobile phone (or referred to as a "cellular" phone), or a computer having a wireless communication function; or the terminal device may be a portable, pocket-sized, handheld, computer built-in, or in-vehicle mobile apparatus.

In the embodiments of the present disclosure, a network device is an apparatus that is deployed in a radio access network and that is configured to provide a wireless communication function for the terminal device. The network device may be a base station, and the base station may include various types of macro base stations, micro base stations, relay stations, or access points. In systems that use different radio access technologies, devices that have a base station function may have different names. For example, what is called an evolved NodeB (evolved NodeB, eNB or eNodeB) in an LTE network is called a Node B in a 3rd Generation (3G) network, or a network device in a subsequent evolution communication device system, but the wording does not constitute a restriction.

Figure 1:
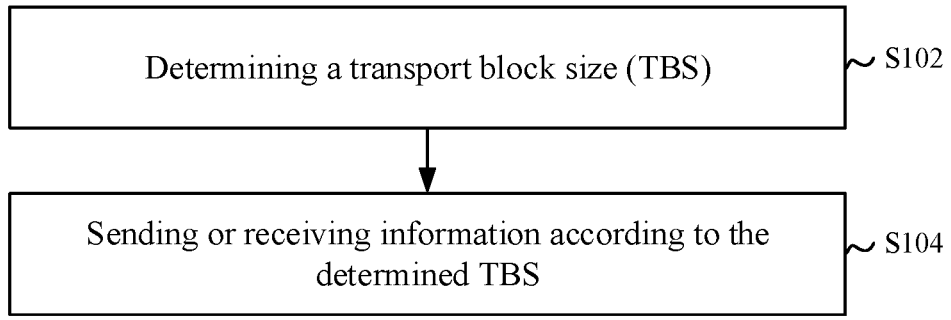
FIG. 1 is a schematic flowchart of a data transmission method according to an embodiment of the present disclosure.

As shown in FIG. 1, one embodiment of the present disclosure provides a data transmission method 100. The method may be performed by a communication device. In other words, the method may be performed by software or hardware installed in the communication device.

The communication device may be a terminal device, or may be a network device. For example, the communication device may be a terminal device in a Uu interface, may also be a terminal device in a sidelink communication system, and may also be a network scheduling node of a third party.

As shown in FIG. 1, the method 100 includes the following steps:

S102: determining a Transport Block Size (TBS).

In one example, the step may be: according to the scheduled resource size and resource overhead, subtracting the resource overhead from the scheduled resource to calculate the TBS. This example is suitable for scenarios of initial transmission and retransmission of a Transport Block (TB).

The resource overhead may include at least one of the following: the resource overhead of a Physical Sidelink Feedback CHannel (PSFCH); the resource overhead of a Channel State Information-Reference Signal (CSI-RS); and the resource overhead of a Tracking Reference Signal (TRS).

In another example, the step may be: taking the TBS in an initial transmission process or in a certain previous retransmission process of a transport block as the TBS of this transmission of the transport block. This example is suitable for the scenario of retransmission of the transport block.

S104: sending or receiving information according to the determined TBS.

The step may be: sending information (or referred to as data) according to the determined TBS; or the step may be: receiving information according to the determined TBS.

For a sending end communication device, data may be sent through a transceiver according to the determined TBS; and for a receiving end communication device, data may be obtained through demodulation according to the determined TBS.

According to the data transmission method provided by the embodiments of present disclosure, the communication device may determine a TBS, and may send or receive information according to the determined TBS. Since the sending end and the receiving end determine the TBS according to a rule before transmission of a transport block, demodulation failure caused by inconsistent understanding between the sending end and the receiving end can be avoided, so that the communication efficiency can be improved.

For example, the embodiment 100 may be applied to a sidelink communication system. Determining the TBS mentioned in S102 may be: calculating the TBS according to the scheduled resource size.

It should be noted that the scheduled resource mentioned in each embodiment of the specification includes a time domain resource for transmitting one TB. The unit of the time domain resource may be a slot, a mini-slot, a multi-slot, a subframe, a millisecond (ms) or a frame.

When the TBS is calculated, different processing mechanisms of the PSFCH resource in the scheduled resource will be described below in a plurality of examples:

1) in one example, in S102, the overhead of PSFCH is directly subtracted from the scheduled resource to calculate the TBS. For example, when the available resource of the transport block is calculated on any time domain scheduling unit (for example, one slot) in one resource pool, the overhead of the PSFCH is subtracted.

2) In one example, if a resource pool is configured with a PSFCH, or a period parameter (sl-PSFCH-Period) of a PSFCH configured by a resource pool is non-zero, when the TBS of a TB transmitted in the resource pool is calculated, an overhead of the PSFCH is subtracted from the scheduled resource to calculate the TBS. For example, when one resource pool is configured with the PSFCH, or sl-PSFCH-Period is configured to be a non-zero value, then the overhead of the PSFCH is subtracted from the scheduled resource when the TBS of the transmitted TB is calculated on any time domain scheduling unit (for example, one slot) in the resource pool.

3) In one example, in S102, when the TBS is calculated, an overhead of a PSFCH is ignored. For example, when the available resource of the transport block is calculated on any time domain scheduling unit (for example, one slot) in one resource pool, the overhead of the PSFCH is not subtracted.

4) In one example, in S102, when the TBS is calculated, if a resource pool is not configured with a PSFCH, or a period parameter of a PSFCH configured by the resource pool is 0, an overhead of the PSFCH is ignored when the TBS of a TB transmitted in the resource pool is calculated. For example, when one resource pool is not configured with PSFCH, or sl-PSFCH-Period is configured to be 0, the overhead of the PSFCH is ignored when the TBS of the transmitted TB is calculated on any time domain scheduling unit (for example, one slot) in the resource pool.

5) In one example, in S102, when the TBS is calculated, if a period parameter (sl-PSFCH-Period) of a PSFCH in one resource pool is greater than or equal to a threshold (for example, N_threshold), when the TBS of the transmitted TB is calculated on any time domain scheduling unit (for example, one slot) in the resource pool, an overhead of the PSFCH is ignored to calculate the TBS; and/or if a period parameter (sl-PSFCH-Period) of a PSFCH in one resource pool is less than a threshold (for example, N_threshold), when the TBS of the transmitted TB is calculated on any time domain scheduling unit (for example, one slot) in the resource pool, an overhead of the PSFCH is subtracted from the scheduled resource. The threshold is a predefined, preconfigured or configured value.

This example may balance the reliability of the transport block and the resource utilization rate of the system. It may be understood that when the density of the PSFCH in the resource pool is high (that is, the period of the PSFCH is small), the overhead of the PSFCH is always subtracted when the TB S of the TB transmitted in the resource pool is calculated, thereby improving the reliability of the transport block.

On the contrary, when the density of the PSFCH in the resource pool is low (that is, the period of the PSFCH is large), the overhead of the PSFCH is always ignored when the TBS of a transport block transmitted in the resource pool is calculated, thereby increasing the resource utilization rate of the system.

6) In one example, S102 is to determine the TBS according to indication information, wherein the indication information is used to indicate whether to ignore (or referred to as whether to calculate) an overhead of the PSFCH when the TBS is calculated. The indication information may perform indication explicitly or implicitly.

The indication information may be included in second-stage Sidelink Control Information (SCI) (that is, SCI format 0-2), or may be included in first-stage SCI (that is, SCI format 0-1). Or the indication information may be included in Downlink Control Information (DCI).

The overhead of the PSFCH mentioned in the examples 1) to 6) may be determined according to a configuration of the PSFCH, or may be determined according to a configuration of a predefined or pre-configured PSFCH, or may be pre-configured or predefined.

For example, determining the TBS mentioned in S102 in the embodiment 100 may be: calculating the TBS according to the scheduled resource size. Various embodiments described below may be performed by a communication device of a sidelink communication device, or may be performed by a communication device of a Uu interface. When the TBS is calculated, different processing mechanisms of a CSI-RS/TRS resource in the scheduled resource will be described below in a plurality of examples:

1) in one example, in S102, when the TBS of a transport block transmitted in a resource pool is calculated, an overhead of a CSI-RS or TRS is subtracted from the scheduled resource. For example, when the TBS of the transmitted TB is calculated on any time domain scheduling unit (for example, one slot) in the resource pool, the overhead of the predefined, pre-configured or configured CSI-RS or TRS is subtracted.

This embodiment may ensure the transmission (including initial transmission or retransmission) of one transport block can perform calculation to obtain the same TBS under the possible different CSI-RS/TRS configurations, and the TB does not need to be coded again, so that the time delay and the power of the communication device can be reduced.

This embodiment assumes that the overhead of the CSI-RS/TRS is always present, the TBS obtained through calculation is smaller. In this way, in the time domain unit not configured with the CSI-RS/TRS, the transmittable data is large, the code rate is smaller, and the reliability of data transmission can be improved.

2) In one example, in S102, when the TBS of a transport block transmitted in the resource pool is calculated, in a case that an initial transmission of a transport block is configured with a CSI-RS or TRS, when the TBS is calculated in the transmission (including initial transmission and retransmission) process of the transport block, an overhead of the CSI-RS or TRS is subtracted from the scheduled resource; or in a case that an initial transmission of a transport block is not configured with a CSI-RS or TRS, when the TBS is calculated in the transmission (including initial transmission and retransmission) process of the transport block, an overhead of the CSI-RS or TRS is ignored.

In this embodiment, the overhead of this part of resource is not calculated in a case that the initial transmission of the transport block is not configured with CSI-RS-TRS, so that the TBS obtained through calculation is larger. In the same time domain unit, the resource utilization rate can be increased compared with the fact that overhead of CSI-RS/TRS is always subtracted.

3) In one example, in S102, when the TBS of the transmission in the resource pool is calculated, In a case that a certain transmission (for example, a certain retransmission) of the transport block is configured with a CSI-RS or TRS, when the TBS is calculated in this transmission process and the later retransmission process of the transport block, an overhead of the CSI-RS or TRS is subtracted from the scheduled resource.

For example, when the TBS is calculated in this transmission process (that is, this transmission configured with the CSI-RS/TRS) of the transport block, the communication device may also clear buffer information of the transport block.

4) In one example, if control information for scheduling a transport block indicates that the TBS is re-calculated and the control information is further used to configure a CSI-RS or TRS, determining the TBS mentioned in S102 includes:

when the TBS is calculated in this transmission process and the later retransmission process of a transport block, subtracting an overhead of the CSI-RS or TRS from the scheduled resource; or when the TBS is calculated from this transmission of the transport block to the next control information indicating TBS re-calculation, subtracting an overhead of the CSI-RS or TRS from the scheduled resource.

For example, when the communication device transmits one transport block and the re-calculation indication in the control information is to re-calculate the TBS, if the control information is configured with the CSI-RS/TRS, the overhead of the CSI-RS/TRS is subtracted from this transmission and the later transmission of the transport block. Or the indication from this transmission of the transport block to the next re-calculation is to subtract the overhead of the CSI-RS/TRS before re-calculation of the TBS.

It should be noted that for the control information mentioned by various embodiments of the present disclosure, when the data transmission method provided by the embodiments of the present disclosure is performed by the communication device in the sidelink communication system, the control information may be Sidelink Control Information (SCI); and when the data transmission method provided by the embodiments of the present disclosure is performed by the communication device in the Uu interface, the control information may be Downlink Control Information (DCI).

5) In one example, S102 is to determine the TBS according to indication information, wherein the indication information is used to indicate whether to ignore (or referred to as whether to calculate) an overhead of a CSI-RS or TRS when the TBS is calculated. The indication information may perform indication explicitly or implicitly.

The indication information may be included in second-stage SCI (that is, SCI format 0-2), or may be included in first-stage SCI (that is, SCI format 0-1). When this embodiment is performed by the communication device in the Uu interface, the indication information may further be included in DCI.

The overhead of the CSI-RS or TRS mentioned in the examples 1) to 5) may be determined through the configuration of CSI-RS or TRS in the scheduled resource, or may be a predefined, pre-configured or configured CSI-RS or TRS pattern or overhead value, or may be determined through the configuration of the CSI-RS or TRS indicated in the control information, wherein the control information is used to indicate that the TBS is re-calculated.

6) In one example, in S102, when the TBS is calculated, if an initial transmission of the transport block is configured with a CSI-RS or TRS, when the TBS is calculated in the transmission (including initial transmission and retransmission) process of a transport block, the same resource overhead is subtracted from the scheduled resource to calculate the TBS.

In this embodiment, through the configuration of the CSI-RS or TRS, parameter configuration in the transport block/the time domain unit is limited. For example, if the initial transmission of one transport block carries CSI-RS or TRS, the transmission (including initial transmission and the subsequent retransmission) of the transport block uses the same CSI-RS/DMRS/TRS, and the second-stage SCI pattern or the same resource overhead.

It should be noted that in previous embodiments, the first five embodiments mainly describe the processing mechanism of the PSFCH resource, the last six embodiments mainly describe the processing mechanism of the CSI-RS/TRS resource, and any one of the first five embodiments and may one of the last six embodiments may be combined. To avoid repetition, the corresponding description is omitted appropriately.

In one example, S102 includes: when the TBS is calculated in an initial transmission and retransmission processes of the transport block, according to an actual Modulation and Coding Scheme (MCS) of the transport block scheduled by the control information, determining a modulation order and/or code rate to calculate the TBS. In this embodiment, the control information may indicate the actual MCS of this transmission of the transport block.

This embodiment may be: in a case that one of the following conditions is met, determining the modulation order and/or code rate according to the MCS indicated in the control information to calculate the TBS: 1) indication information for indicating to re-calculate the TBS is received; and 2) New Data Indicator (NDI) is turned over.

In one example, determining the TBS mentioned in S102 includes: determining the TBS according to the indication information, wherein the indication information is included in the control information for scheduling a transport block, and the indication information is used to indicate whether to re-calculate the TBS. The indication information may perform indication explicitly or implicitly.

In this embodiment, the control information for scheduling transport block carries TBS re-calculation indication (that is, the above indication information), the TBS re-calculation indicates the communication device whether to clear buffer of the HARQ process corresponding to the transport block.

1) In one example, TBS re-calculation is explicit indication (for example, 1-bit indication in the control information), or is implicit indication (for example, domain combined coding indication in the TBS re-calculation and the control information).

In some embodiments, if the TBS re-calculation indication is 1, or the combined domain indication is a codepoint a (a is a valued predefined, configured or pre-configured by a protocol). The communication device clears the buffer corresponding to the transport block. The available resource of the transport block is calculated according to the MCS indicated in the control information and according to any one or more of the above embodiments to calculate the TBS.

In some embodiments, if the TBS re-calculation indication is 0 (having a corresponding relationship with the above re-calculation indication, certainly, the re-calculation indication is 0 and non-re-calculation indication is 1), or the combined domain indication is a codepoint b (b is a predefined/(pre-)configured value and different from a). The communication device takes the TBS calculated by the latest effective control information of the transport as the TBS of a transport block scheduled by the control information carrying the indication information.

The aforementioned latest effective control information includes one of the following two:

a) the latest received control information, wherein the indication information included in the control information indicates that the TBS is re-calculated. For example, the latest effective control information is: the latest control information when the TBS re-calculation indication in the control information for scheduling the transport block is 1 or the combined domain indication is a codepoint a.

b) The farthest control information when the NDI corresponding to the transport block/HARQ process is as same as the NDI in the current control information. For example, the latest effective control information is: the farthest control information when the NDI corresponding to the transport block or HARQ process is as same as the NDI in the current control information, and may be the control information for scheduling the transport block to perform initial transmission.

2) In one example, in a case of meeting at least one of the following, the indication information indicates that the TBS is re-calculated (the TBS re-calculation indication is 0 or the combined domain indication is a codepoint b):

NDI is turned over;

ACK information is not received after transmission (sending) of the transport block, wherein the transport block is configured with ACK/NACK feedback;

NACK information is received after transmission (sending) of the transport block; and a number of blind retransmissions of the transport block reaches a preset threshold.

In one embodiment, an updating period N of blind retransmission may be predefined, pre-configured or configured. In this way, determining the TBS in S102 includes:

when a number of blind retransmission of one transport block reaches N, re-calculating the TBS during the next retransmission of the transport block. For blind retransmission, this embodiment can avoid the influence of the TBS calculation error of all the subsequent resources caused by the initial transmission failure of the transport block.

In one example, the communication device may be configured with multiple groups of resource overheads. In this way, during transmission of the transport block, the control information indicates one group of resource overhead (referred to as target resource overhead), for the communication device to subtract the target resource overhead from the scheduled resource to calculate the TBS.

In one example, the communication device may be configured with multiple groups of resource overheads. In this way, during transmission of the transport block, one group of indicated resource overhead (referred to as target resource overhead) may be acquired according to configuration information, for the communication device to subtract the target resource overhead from the scheduled resource to calculate the TBS.

The multiple groups of resource overheads mentioned in the above two embodiments may be related to at least one of the following:

a resource overhead of a PSFCH;
a resource overhead of a CSI-RS;
a resource overhead of a TRS;
a resource overhead of a second-stage SCI;
a resource overhead of a Phase-Tracking Reference Signal (PTRS); and a resource overhead of a DeModulation Reference Signal (DMRS).

The multiple groups of resource overheads mentioned in the above two embodiments further may be related to at least one of the following:
whether a PSFCH is enabled;
a configuration of the CSI-RS;
the number of symbols of a PSFCH; and
a configuration period of the PSFCH.

To describe the data transmission method provided by the embodiments of the present disclosure in detail, the data transmission method will be described below with reference to several embodiments.

Embodiment 1

The communication device is configured on a certain resource pool to perform sidelink data transmission, and in the configuration of the resource pool, a PSFCH-Period indication value (or referred to as a period parameter of the PSFCH) configured by the PSFCH is non-zero.

In this embodiment, the communication device obtains the number and positions of available resources of sidelink according to lengths of an initial symbol and a resource symbol in Radio Resource Control (RRC) configuration, and a length of a symbol indicated in SCI.

If the period of configuring the PSFCH in the resource pool is non-zero, the resource overhead of the PSFCH is subtracted when the communication device transmitted in the resource pool calculates the available resources.

Figure 2:
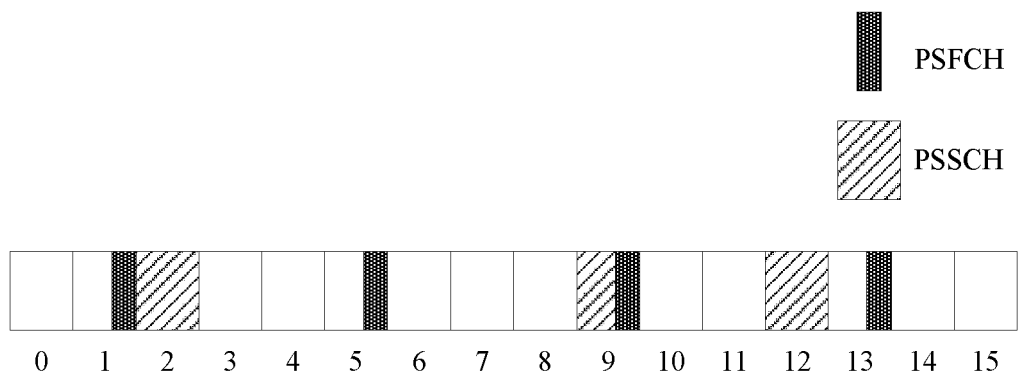
FIG. 2 is a schematic diagram of PSFCH resource allocation according to an embodiment of the present disclosure.

As shown in FIG. 2, the period of configuring the PSFCH in the resource pool is 4, the PSFCH is configured in the slots 1, 5, 9 and 13. When the communication device sends or receives Physical Sidelink Shared CHannel (PSSCH) in the slots 2, 9 and 12, the overhead of the PSFCH is subtracted during TBS calculation.

Embodiment 2

The communication device is configured on a certain resource pool to perform sidelink data transmission, and the value of a pre-configured N_threshold is 4.

If the period parameter of the PSFCH in the resource pool is 4 (equal to N_threshold), when the communication device transmitted in the resource pool calculates the available resource, the resource overhead of the PSFCH is not considered. As shown in FIG. 2, the PSFCH is configured in the slots 1, 5, 9 and 13. When the communication device sends or receives PSSCH in the slots 2, 9 and 12, the overhead of the PSFCH is ignored (not considered) when the available resource is calculated in the process of calculating the TBS. That is, the overhead of the PSFCH is not subtracted.

Figure 3:
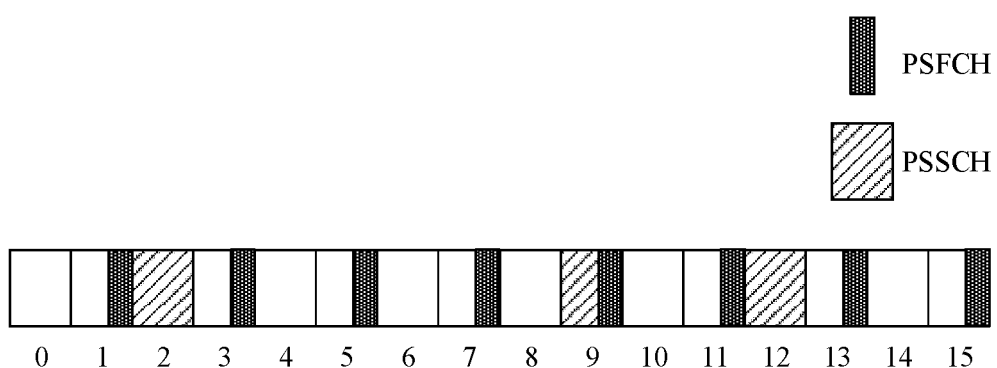
FIG. 3 is a schematic diagram of PSFCH resource allocation according to another embodiment of the present disclosure.

If the period parameter of the PSFCH in the resource pool is 2 (less than N_threshold), the resource overhead of the PSFCH is subtracted when the communication device transmitted in the resource pool calculates the available resource. As shown in FIG. 3, the PSFCH is configured in the slots 1, 3, 5, 7, 9, 11, 13 and 15. When the communication device sends or receives PSSCH in the slots 2, 9 and 12, the overhead of the PSFCH is subtracted when the available resource is calculated in the process of calculating the TBS.

Embodiment 3

Figure 4:
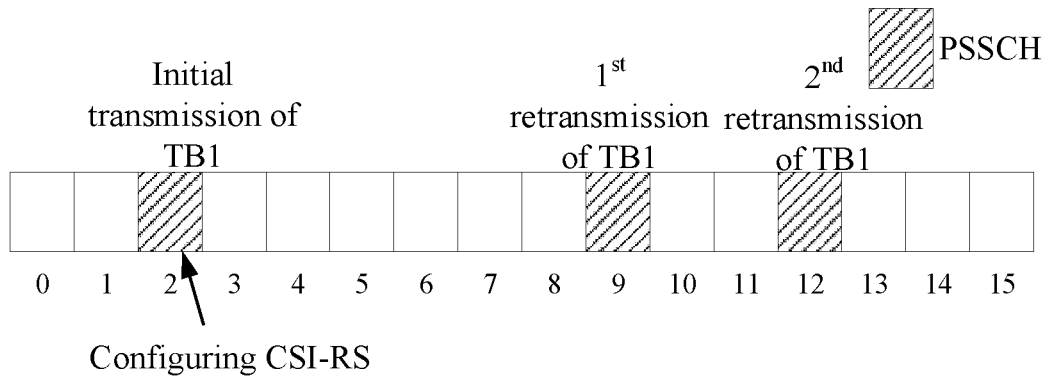
FIG. 4 is a schematic diagram of a TB1 transport resource according to an embodiment of the present disclosure.

As shown in FIG. 4, the communication device is configured with CSI-RS during initial transmission of TB1 in the slot 2. When the TBS is calculated in the transmission (including initial transmission or subsequent two retransmissions) process of the TB1, the overhead of the CSI-RS configured in the initial transmission process is subtracted, or the overhead value of the pre-configured CSI-RS is subtracted.

In FIG. 4, when the communication device sends or receives PSSCH in the slots 2, 9 and 12, the overhead of the CSI-RS is subtracted when the available resource is calculated in the process of calculating the TBS.

Embodiment 4

Figure 5:
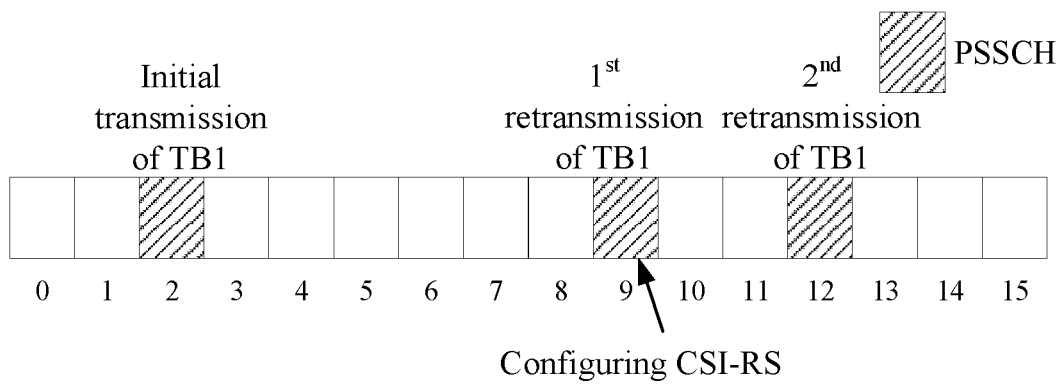
FIG. 5 is a schematic diagram of a TB1 transport resource according to another embodiment of the present disclosure.

As shown in FIG. 5, the communication device is not configured with CSI-RS during initial transmission of TB1 in the slot 2; and the CSI-RS is configured during the first retransmission of the TB1 in the slot 9. When the available resource of the TB1 is calculated, the overhead of the CSI-RS is not considered.

In FIG. 5, when the communication device sends or receives PSSCH in the slots 2, 9 and 12, the overhead of the CSI-RS is not considered when the available resource is calculated in the process of calculating the TBS. That is, the overhead of the CSI-RS is not subtracted.

Embodiment 5

As shown in FIG. 5, the communication device is not configured with CSI-RS during initial transmission of TB1 in the slot 2; and the CSI-RS is configured during the first retransmission of the TB1 in the slot 9, and the overhead of the CSI-RS is considered when the available resource is calculated in the first retransmission process of the TB1 in the slot 9 and the second retransmission process of the TB1 in the slot 12.

In FIG. 5, when the communication device sends or receives PSSCH in the slots 9 and 12, the overhead of the CSI-RS is subtracted when the available resource is calculated in the process of calculating the TBS.

In this embodiment, the TBSs obtained through calculation of the initial transmission (slot 2) and the retransmission (slot 9 and slot 12) of the TB1 are different. This embodiment can consider the CSI-RS as indication information for re-calculating the TBS. Meanwhile, the sending end and the receiving end need to clear the buffer information in the HARQ entity in the slot 9.

Embodiment 6

In this embodiment, SCI carries 1-bit re-calculation indication:
when the predefined re-calculation codepoint is 1, the communication device clears the buffer corresponding to the transport block, calculates the available resource according to the configuration in the current scheduling time domain unit, and then determines the modulation order and code rate according to the MCS indicated in the SCI to re-calculate the TBS; and
when the predefined re-calculation codepoint is 0, the communication device takes the TBS calculated by SCI when the latest re-calculation indication of the transport block is 1 as the TBS of the current scheduled transmission.

Figure 6:
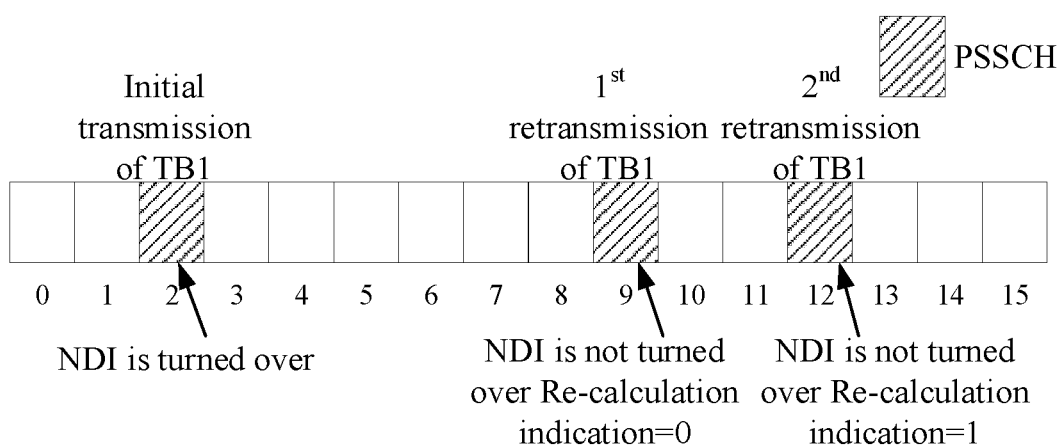
FIG. 6 is an indication schematic diagram of re-calculating a TBS according to an embodiment of the present disclosure.

In FIG. 6, the communication device performs initial transmission of TB1 in the slot 2, and the communication device calculates the available resource according to the configuration in the slot 2 to further calculate the TBS.

Retransmission of TB1 is performed in the slot 9. If the re-calculation indication is re-calculation=0, the communication device takes the TBS indicated by the latest effective SCI (for example, the SCI in the slot 2) as the TBS of the current transmission.

Retransmission of TB1 is performed in the slot 12. If the re-calculation indication is re-calculation=1, the communication device calculates the available resource according to the indication of the SCI in the slot 12 to further re-calculate the TBS. Meanwhile, the buffer information in the HARQ entity is cleared.

In this embodiment, the communication device may re-calculate the TBS according to the resource indicated in the current SCI so as to reduce the problem of continuous packet loss/demodulation failure caused by the fact that all the retransmissions of the TB cannot obtain the accurate TBS subsequently due to packet loss in initial transmission. Therefore, the transmission success rate of data packets is increased, and the resource utilization rate of the system can also be increased.

The data transmission method according to the embodiments of the present disclosure is described in detail above with reference to FIG. 1 to FIG. 6. The communication device according to the embodiments of the present disclosure will be described in detail below with reference to FIG. 7.

Figure 7:
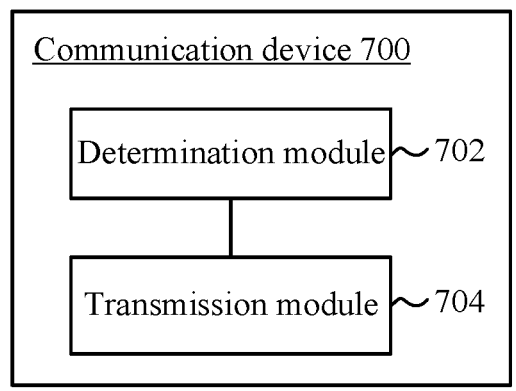
FIG. 7 is a schematic structural diagram of a communication device according to an embodiment of the present disclosure.

FIG. 7 is a schematic structural diagram of a communication device according to an embodiment of the present disclosure. As shown in FIG. 7, the communication device 700 includes:
- a determination module 702 which may be configured to determine a TBS; and
- a transmission module 704 which may be configured to send or receive information according to the determined TBS.

In the embodiments of present disclosure, the communication device may determine a TBS, and may send or receive information according to the determined TBS. Since the sending end and the receiving end determine the TBS according to a rule before transmission of a transport block, demodulation failure caused by inconsistent understanding between the sending end and the receiving end can be avoided, so that the communication efficiency can be improved.

In an embodiment, the determination module 702 may be configured to:
- subtract an overhead of a Physical Sidelink Feedback CHannel (PSFCH) from a scheduled resource and calculate the TBS;
- if a resource pool is configured with a PSFCH, when the TBS of a transport block transmitted in the resource pool is calculated, subtract an overhead of the PSFCH from the scheduled resource; and
- if a period parameter of a PSFCH configured by a resource pool is non-zero, when the TBS of a transport block transmitted in the resource pool is calculated, subtract an overhead of the PSFCH from the scheduled resource.

In an embodiment, the determination module 702 may be configured to perform one of the following operations of:
- when the TBS is calculated, ignoring an overhead of a PSFCH;
- if a resource pool is not configured with a PSFCH, when the TBS of a transport block transmitted in the resource pool is calculated, ignoring an overhead of the PSFCH; and
- if a period parameter of a PSFCH configured by a resource pool is 0, when the TBS of a transport block transmitted in the resource pool is calculated, ignoring an overhead of the PSFCH.

In an embodiment, the determination module 702 may be configured to perform one of the following operations of:
- if a period parameter of a PSFCH is greater than or equal to a threshold, when the TBS of a transport block transmitted in a resource pool is calculated, ignoring an overhead S of the PSFCH; and
- if a period parameter of a PSFCH is less than a threshold, when the TBS of a transport block transmitted in a resource pool is calculated, subtracting an overhead of the PSFCH from the scheduled resource,
- wherein the threshold is a predefined, a pre-configured or configured value.

In an embodiment, the determination module 702 may be configured to:
- determine the TBS according to indication information,
- wherein the indication information is used to indicate whether to ignore an overhead of a PSFCH when the TBS is determined.

In an embodiment,
- the overhead of the PSFCH is determined according to a configuration of the PSFCH; or
- the overhead of the PSFCH is determined according to a configuration of a predefined or pre-configured PSFCH; or
- the overhead of the PSFCH is pre-configured or pre-defined.

In an embodiment, the determination module 702 may be configured to:
- when the TBS of a transport block transmitted in a resource pool is calculated, subtract an overhead of a Channel State Information-Reference Signal (CSI-RS) or a Tracking Reference Signal (TRS) from a scheduled resource.

In an embodiment, the determination module 702 may be configured to:
- in a case that an initial transmission of a transport block is configured with a CSI-RS or TRS, when the TBS is calculated in the transmission process of the transport block, subtract an overhead of the CSI-RS or TRS from the scheduled resource; or
- in a case that an initial transmission of a transport block is not configured with a CSI-RS or TRS, when the TBS is calculated in the transmission process of the transport block, ignore an overhead of the CSI-RS or TRS.

In an embodiment, the determination module 702 may be configured to:
- in a case that a certain transmission of the transport block is configured with a CSI-RS or TRS, when the TBS is calculated in this transmission process and the later retransmission process of the transport block, subtract an overhead of the CSI-RS or TRS from the scheduled resource.

In an embodiment, the determination module 702 may be configured to: when the TBS is calculated in this transmission of the transport block, clear buffer information of the transport block.

In an embodiment, if control information for scheduling a transport block indicates that the TBS is re-calculated, and the control information is further configured to configure a CSI-RS or TRS. The determination module 702 may be configured to:

when the TBS is calculated in this transmission process and the later retransmission process of the transport block, subtract an overhead of the CSI-RS or TRS from the scheduled resource; or when the TBS is calculated from this transmission of the transport block to the next control information indicating TBS re-calculation, subtract an overhead of the CSI-RS or TRS from the scheduled resource.

In an embodiment, the determination module 702 may be configured to:

determine the TBS according to indication information, wherein the indication information is used to indicate whether to ignore an overhead of a CSI-RS or TRS when the TBS is determined.

In an embodiment, the overhead of the CSI-RS or TRS is:

determined by a configuration of the CIS-RS or TRS in the scheduled resource; or a predefined, pre-configured or configured CSI-RS or TRS pattern or an overhead value; or determined by a configuration of the CSI-RS or TRS indicated in the control information, wherein the control information is used to indicate that the TBS is re-calculated.

In an embodiment, the determination module 702 may be configured to:

if an initial transmission of a transport block is configured with a CSI-RS or TRS, when the TBS is calculated in the transmission process of the transport block, subtract the same resource overhead from the scheduled resource to calculate the TBS.

In an embodiment, the determination module 702 may be configured to:

when the TBS is calculated in an initial transmission and retransmission processes of a transport block, determine a modulation order and/or code rate according to an actual Modulation and Coding Scheme (MCS) of the transport block scheduled by control information to calculate the TBS.

In an embodiment, the determination module 702 may be configured to:

in a case that one of the following conditions is met, determine the modulation order and/or code rate according to the MCS indicated in the control information to calculate the TBS:

indication information for indicating to re-calculate the TBS is received; and

New Data Indicator (NDI) is turned over.

In an embodiment, the determination module 702 may be configured to:

determine the TBS according to indication information, wherein the indication information is included in the control information for scheduling a transport block, and the indication information is used to indicate whether to re-calculate the TBS.

In an embodiment, the indication information performs indication explicitly; or the indication information performs indication implicitly.

In an embodiment, the indication information is used to indicate that buffer information of a transport block is cleared and the TBS is re-calculated.

In an embodiment, the indication information is used to indicate that the TBS is not re-calculated, wherein the determination module 702 may be configured to: take the TBS calculated by the latest effect control information of a transport block as the TBS of transport block scheduled by control information carrying the indication information.

In an embodiment, the latest effective control information includes:

the latest received control information, wherein the indication information included in the control information indicates that the TBS is re-calculated; or the farthest control information when the NDI corresponding to the transport block/HARQ process is as same as the NDI in the current control information.

In an embodiment, in a case that at least one of the following conditions is met, the indication information indicates that the TBS is re-calculated: NDI is turned over;

ACK information is not received after transmission of the transport block;

NACK information is received after transmission of the transport block; and a number of blind retransmissions of the transport block reaches a preset threshold.

In an embodiment, the determination module 702 may be configured to:

in a case that a number of blind retransmissions of the transport block reaches a preset threshold, re-calculate the TBS.

In an embodiment, the determination module 702 may be configured to:

subtract a target resource overhead from the scheduled resource to calculate the TBS, wherein the target resource overhead is indicated by control information, or the target resource overhead is determined according to configuration information; and the target resource overhead is one of multiple groups of resource overheads corresponding to the communication device.

In an embodiment, the multiple groups of resource overheads are related to at least one of the following:

a resource overhead of a PSFCH;

a resource overhead of a CSI-RS;

a resource overhead of a TRS;

a resource overhead of a second-stage SCI;

a resource overhead of a Phase-Tracking Reference Signal (PTRS);

a resource overhead of a DeModulation Reference Signal (DMRS);

In an embodiment, the multiple groups of resource overheads are related to at least one of the following:

whether a PSFCH is enabled;

a configuration of the CSI-RS;

the number of symbols of a PSFCH; and a configuration period of the PSFCH.

The terminal device 700 according to the embodiments of the present disclosure may be referenced to the flow corresponding to the method 100 according to the corresponding embodiments of the present disclosure. Furthermore, each unit/module in the terminal device 700 and the foregoing other operations and/or functions are used to implement corresponding flows of the method 100, and the same or equivalent technical effect can be achieved. For brevity, details are not described herein again.

The embodiments in this specification are described in a progressive manner. Each embodiment usually focuses on a difference from other embodiments. For a same or similar part of the embodiments, refer to each other. The device embodiment is described simply because the device embodiment is basically similar to the method embodiment. For related details, refer to partial description of the method embodiment.

Figure 8:
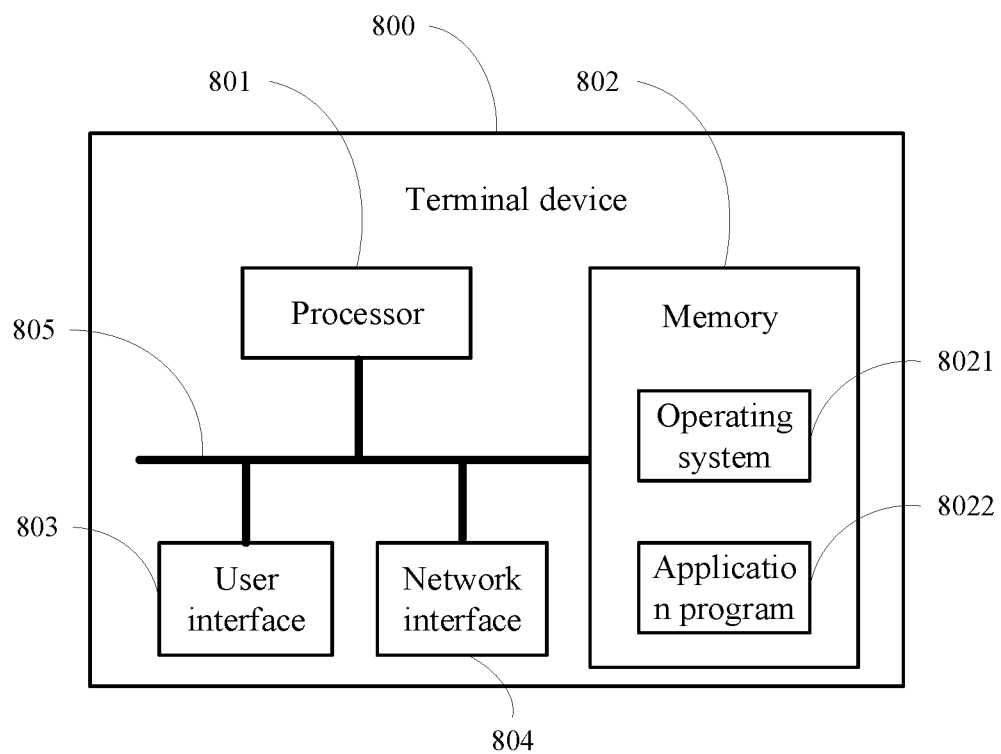
FIG. 8 is a schematic structural diagram of a terminal device according to an embodiment of the present disclosure.

FIG. 8 is a block diagram of a terminal device according to another embodiment of the present disclosure. The terminal device 800 shown in FIG. 8 includes at least one processor 801, a memory 802, at least one network interface 804, and a user interface 803. All components of the terminal device 800 are coupled together by using a bus system 805. It can be understood that the bus system 805 is configured to implement connection and communication between these components. In addition to a data bus, the bus system 805 further includes a power bus, a control bus, and a status signal bus. However, for clear description, various buses are marked as the bus system 805 in FIG. 8.

The user interface 803 may include a display, a keyboard, a clicking device (for example, a mouse or a trackball), a touch panel, or a touchscreen.

It can be understood that the memory 802 in this embodiment of the present disclosure may be a volatile memory or a non-volatile memory, or may include both a volatile memory and a non-volatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), and is used as an external cache. By way of example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM).

The memory 802 in the system and the method that are described in the embodiments of the present disclosure is to include but is not limited to these memories and any other suitable types of memories.

In some implementations, the memory 802 stores the following elements: an executable module or a data structure, a subset thereof, or an extension set thereof: an operating system 8021 and an application program 8022.

The operating system 8021 includes various system programs, such as a framework layer, a core library layer, a driver layer, and the like, and is configured to implement various base station's services and process hardware-based tasks. The application program 8022 includes various application programs, for example, a media player and a browser, and is used to implement various application services. A program for implementing the method in the embodiments of the present disclosure may be included in the application 8022.

In this embodiment of the present disclosure, the terminal device 800 further includes a computer program stored in a memory 802 and capable of running on a processor 801; and when the computer program is executed by the processor 801, the steps of the following method embodiment 100 are implemented.

The method disclosed in the foregoing embodiment of the present disclosure may be applied to the processor 801, or implemented by the processor 801. The processor 801 may be an integrated circuit chip having a signal processing capability. During implementation, each step of the foregoing method may be completed by using an integrated logic circuit of hardware in the processor 801 or an instruction in a form of software. The foregoing processor 801 may be a general-purpose processor, a Digital Signal Processor (DSP), an Application-Specific Integrated Circuit (ASIC), a Field Programmable Gate Array (FPGA) or another programmable logic device, a discrete gate or transistor logic device, or a discrete hardware component. The processor may implement or perform the methods, the steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly executed and accomplished through a hardware decoding processor, or may be executed and accomplished by using a combination of hardware and software modules in the decoding processor. The software module may be located in a mature computer-readable storage medium in this field such as a random access memory, a flash memory, a read-only memory, a programmable read-only memory, an electrically erasable programmable memory, a register, or the like. The computer-readable storage medium is located in the memory 802, and the processor 801 reads information in the memory 802 and completes the steps in the foregoing method in combination with hardware of the processor. Specifically, the computer-readable storage medium stores a computer program, and when the computer program is executed by the processor 801, the steps of the foregoing method embodiment 100 are performed.

It can be understood that the embodiments described in the present disclosure may be implemented by hardware, software, firmware, middleware, microcode, or a combination thereof. For implementation with hardware, the processing unit may be implemented in one or more Application Specific Integrated Circuit (ASIC), a Digital Signal Processor (DSP), a Digital Signal Processing Device (DSP Device, DSPD), a Programmable Logic Device (PLD), a Field-Programmable Gate Array (FPGA), a general-purpose processor, a controller, a microcontroller, a microprocessor, another electronic unit for implementing the functions of this application, or a combination thereof.

For implementation with software, technologies described in the embodiments of the present disclosure may be implemented by using a module (for example, a process or a function) that performs the function in the embodiments of the present disclosure. A software code may be stored in the memory and executed by the processor. The memory may be implemented in the processor or outside the processor.

The terminal device 800 can implement each process implemented by the terminal device in the foregoing embodiments, and the same or equivalent technical effect can be achieved. To avoid repetition, details are not described herein again.

Figure 9:
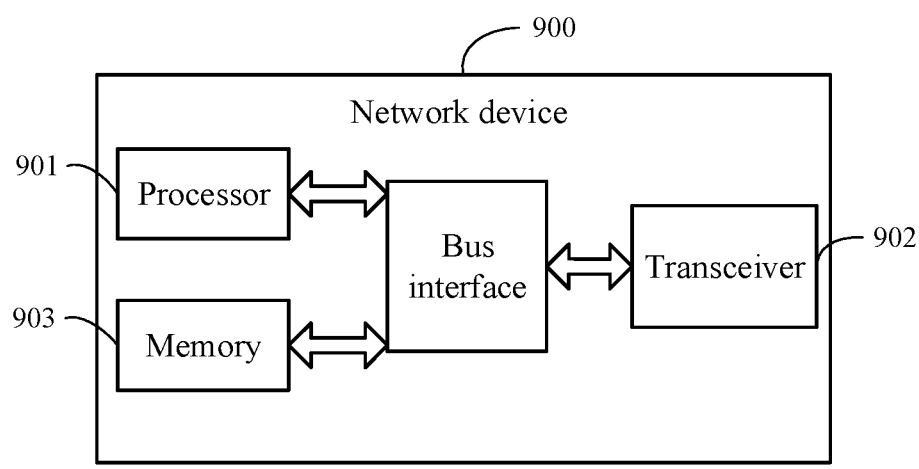
FIG. 9 is a schematic structural diagram of a network device according to an embodiment of the present disclosure.

Refer to FIG. 9, which is a structural diagram of a network device applied in an embodiment of the present disclosure. The network device can implement details of the method embodiment 100 and achieve a same effect. As shown in FIG. 9, a network device 900 includes a processor 901, a transceiver 902, a memory 903, and a bus interface.

In the embodiment of the present disclosure, the network device 900 further includes: a computer program stored in the memory 903 and capable of miming on the processor 901. When the computer program is executed by the processor 901, the steps of the method embodiment 100 are implemented.

In FIG. 9, a bus architecture may include any quantity of interconnected buses and bridges, and is specifically linked by various circuits of one or more processors represented by the processor 901 and a memory represented by the memory 903. The bus architecture may further link various other circuits such as a peripheral device, a voltage regulator, and a power management circuit together. These are all well-known in the art, and therefore are not further described in this specification. The bus interface provides interfaces. The transceiver 902 may be a plurality of elements, in other words, includes a transmitter and a receiver, and provides a unit configured to communicate with various other apparatuses on a transmission medium.

The processor 901 is responsible for managing the bus architecture and common processing, and the memory 903 may store data used when the processor 901 performs an operation.

An embodiment of the present disclosure further provides a computer-readable storage medium. The computer-readable storage medium stores a computer program; when the computer program is executed by a processor, the processes in the foregoing embodiment of the method 100 are implemented; and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A data transmission method, performed by a communication device, the method comprising:
    determining a Transport Block Size (TBS) according to indication information; and
    sending or receiving information according to the determined TBS,
    wherein the determining the TBS comprises:
    determining whether to ignore an overhead of a Physical Sidelink Feedback CHannel (PSFCH) according to a period parameter of the PSFCH and Sidelink Control Information (SCI), comprising:
        in response to the period parameter of the PSFCH being a first preset value, determining to ignore the overhead of the PSFCH in calculating the TBS;
        in response to the period parameter of the PSFCH being a value different from the first preset value, determining to whether to ignore the overhead of the PSFCH in calculating the TBS further according to a PSFCH overhead indication field in the SCI, comprising:
            in response to the PSFCH overhead indication field in SCI instructing to ignore the overhead of the PSFCH, determining to ignore the overhead of the PSFCH; and
            in response to the PSFCH overhead indication field in SCI instructing not to ignore the overhead of the PSFCH, determining not to ignore the overhead of the PSFCH.

2. The method according to claim 1, wherein the determining the TBS further comprises one of the following:
    when the TBS is calculated, ignoring the overhead of the PSFCH;
    when a resource pool is not configured with the PSFCH, and when the TBS of a transport block transmitted in the resource pool is calculated, ignoring the overhead of the PSFCH; or
    when the period parameter of the PSFCH configured by the resource pool is 0, and when the TBS of the transport block transmitted in the resource pool is calculated, ignoring the overhead of the PSFCH.

3. The method according to claim 2, wherein the overhead of the PSFCH is determined according to a configuration of the PSFCH;
    the overhead of the PSFCH is determined according to a configuration of a predefined or pre-configured PSFCH; or
    the overhead of the PSFCH is pre-configured or pre-defined.

4. The method according to claim 1, wherein the SCI is a first stage SCI.

5. The method according to claim 1, wherein the determining the TBS further comprises:
    when the TBS of a transport block transmitted in a resource pool is calculated, subtracting an overhead of a Channel State Information-Reference Signal (CSI-RS) or a Tracking Reference Signal (TRS) from a scheduled resource.

6. The method according to claim 4, wherein the overhead of the CSI-RS or TRS is:
    determined by a configuration of the CSI-RS or TRS in the scheduled resource;
    a predefined, pre-configured or configured CSI-RS or TRS pattern or an overhead value; or
    determined by the configuration of the CSI-RS or TRS indicated in the control information, wherein the control information is used to indicate that the TBS is re-calculated.

7. The method according to claim 1, wherein the determining the TBS comprises:
    when an initial transmission of a transport block is configured with a Channel State Information-Reference Signal (CSI-RS) or Tracking Reference Signal (TRS), and when the TBS is calculated in a transmission process of the transport block, subtracting an overhead of the CSI-RS or TRS from a scheduled resource;
    when an initial transmission of a transport block is not configured with a CSI-RS or TRS, and when the TBS is calculated in the transmission process of the transport block, ignoring the overhead of the CSI-RS or TRS; or when a certain transmission of the transport block is configured with a Channel State Information-Reference Signal (CSI-RS) or a Tracking Reference Signal (TRS), and when the TBS is calculated in this transmission process and the later retransmission process of the transport block, subtracting the overhead of the CSI-RS or TRS from the scheduled resource.

8. The method according to claim 1, wherein when control information for scheduling a transport block indicates that the TBS is re-calculated and the control information is further used to configure a Channel State Information-Reference Signal (CSI-RS) or a Tracking Reference Signal (TRS), the determining the TBS comprises:

when the TBS is calculated in this transmission process and the later retransmission process of the transport block, subtracting an overhead of the CSI-RS or TRS from a scheduled resource; or when the TBS is calculated from this transmission of the transport block to the next control information indicating TBS re-calculation, subtracting the overhead of the CSI-RS or TRS from the scheduled resource.

9. The method according to claim 1, wherein wherein the indication information is further used to indicate whether to ignore an overhead of a Channel State Information-Reference Signal (CSI-RS) or a Tracking Reference Signal (TRS) when the TBS is determined.

10. The method according to claim 1, wherein the determining the TBS further comprises:

when the TBS is calculated in an initial transmission and retransmission processes of a transport block, determining a modulation order or code rate according to an actual Modulation and Coding Scheme (MCS) of the transport block scheduled by control information to calculate the TBS.

11. The method according to claim 1, wherein the indication information is comprised in control information for scheduling a transport block, and the indication information is used to indicate whether to re-calculate the TBS.

12. The method according to claim 11, wherein the indication information is used to indicate that buffer information of the transport block is cleared and the TBS is re-calculated; or wherein the indication information is used to indicate that the TBS is not re-calculated; and the determining the TBS further comprises: taking the TBS calculated by the latest effect control information of a transport block as the TBS of transport block scheduled by control information carrying the indication information.

13. The method according to claim 11, wherein when at least one of the following conditions is met, the indication information indicates that the TBS is re-calculated:

New Data Indicator (NDI) is turned over;

ACKnowledgement (ACK) information is not received after transmission of the transport block;

Negative ACKnowledgement (NACK) information is received after transmission of the transport block; or a number of blind retransmissions of the transport block reaches a preset threshold.

14. The method according to claim 1, wherein the determining the TBS further comprises:

when a number of blind retransmissions of the transport block reaches a preset threshold, re-calculating the TBS.

15. The method according to claim 1, wherein the determining the TBS further comprises:

subtracting a target resource overhead from a scheduled resource to calculate the TBS, wherein the target resource overhead is determined according to configuration information.

16. The method according to claim 15, wherein the target resource overhead is related to at least one of the following:

a resource overhead of a Channel State Information-Reference Signal (CSI-RS); or a resource overhead of a Phase-Tracking Reference Signal (PTRS).

17. The method according to claim 1, wherein:

when the period parameter of the PSFCH is 0, the overhead of the PSFCH is ignored;

when the period parameter of the PSFCH is 1, the overhead of the PSFCH is not ignored; and when the period parameter of the PSFCH is 2 or 4, whether to ignore the overhead of the PSFCH is determined according to the PSFCH overhead indication field in the SCI.

18. A communication device, comprising:

a memory storing computer-readable instructions; and a processor coupled to the memory and configured to execute the computer-readable instructions, wherein the computer-readable instructions, when executed by the processor, cause the processor to perform operations comprising:

determining a Transport Block Size (TBS) according to indication information; and sending or receiving information according to the determined TBS, wherein the determining the TBS comprises:

determining whether to ignore an overhead of a Physical Sidelink Feedback CHannel (PSFCH) according to a period parameter of the PSFCH and Sidelink Control Information (SCI), comprising:

in response to the period parameter of the PSFCH being a first preset value, determining to ignore the overhead of the PSFCH in calculating the TBS;

in response to the period parameter of the PSFCH being a value different from the first preset value, determining to whether to ignore the overhead of the PSFCH in calculating the TBS further according to a PSFCH overhead indication field in the SCI, comprising:

in response to the PSFCH overhead indication field in the SCI instructing to ignore the overhead of the PSFCH, determining to ignore the overhead of the PSFCH; and in response to the PSFCH overhead indication field in the SCI instructing not to ignore the overhead of the PSFCH, determining not to ignore the overhead of the PSFCH.

19. The communication device according to claim 8, wherein the SCI is a first stage SCI.

20. A non-transitory computer readable medium storing instructions that, when executed by a processor, cause the processor to perform a data transmission method, wherein the method comprises:

determining a Transport Block Size (TBS) according to indication information; and sending or receiving information according to the determined TBS, wherein the determining the TBS comprises:
determining whether to ignore an overhead of a Physical Sidelink Feedback CHannel (PSFCH) according to a period parameter of the PSFCH and Sidelink Control Information (SCI), comprising:
- in response to the period parameter of the PSFCH being a first preset value, determining to ignore the overhead of the PSFCH in calculating the TBS;
- in response to the period parameter of the PSFCH being a value different from the first preset value, determining to whether to ignore the overhead of the PSFCH in calculating the TBS further according to a PSFCH overhead indication field in the SCI, comprising:
  - in response to the PSFCH overhead indication field in the SCI instructing to ignore the overhead of the PSFCH, determining to ignore the overhead of the PSFCH; and
  - in response to the PSFCH overhead indication field in the SCI instructing not to ignore the overhead of the PSFCH, determining not to ignore the overhead of the PSFCH.

\* \* \* \* \*